United States Patent
Yamamoto

(12) United States Patent (10) Patent No.: US 11,039,027 B2
Yamamoto (45) Date of Patent: Jun. 15, 2021

(54) IMAGE READING APPARATUS WHICH DETECTS A STAPLE ATTACHED TO A DOCUMENT AND METHOD OF CONTROLLING THE IMAGE READING APPARATUS

(71) Applicant: KYOCERA Document Solutions Inc., Osaka (JP)

(72) Inventor: Hirokazu Yamamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/908,432

(22) Filed: Jun. 22, 2020

(65) Prior Publication Data
US 2020/0412893 A1    Dec. 31, 2020

(30) Foreign Application Priority Data
Jun. 26, 2019 (JP) .............................. JP2019-118691

(51) Int. Cl.
*H04N 1/04* (2006.01)
*H04N 1/00* (2006.01)

(52) U.S. Cl.
CPC ..... *H04N 1/00694* (2013.01); *H04N 1/00639* (2013.01); *H04N 1/00644* (2013.01); *H04N 1/00689* (2013.01); *H04N 1/00716* (2013.01)

(58) Field of Classification Search
None
See application file for complete search history.

(56) References Cited

U.S. PATENT DOCUMENTS

| 5,087,027 | A | * | 2/1992 | Acquaviva | ............. | G03G 15/60 |
| | | | | | | 271/165 |
| 2003/0067107 | A1 | * | 4/2003 | Ikeda | ...................... | B25C 11/00 |
| | | | | | | 270/58.33 |
| 2016/0304305 | A1 | * | 10/2016 | Link | .................. | H04N 1/00323 |
| 2018/0152575 | A1 | * | 5/2018 | Muto | ................. | H04N 1/00599 |
| 2019/0047810 | A1 | * | 2/2019 | Fusayasu | ................. | H04N 1/00 |
| 2020/0374414 | A1 | * | 11/2020 | Hibino | ............... | H04N 1/00904 |

FOREIGN PATENT DOCUMENTS

JP    H 08-015927 A    1/1996

* cited by examiner

*Primary Examiner* — Dung D Tran
(74) *Attorney, Agent, or Firm* — Stein IP, LLC

(57) ABSTRACT

An image reading apparatus includes a document tray, a set document sensor, a sheet feed rotary member, an image reader, a staple detector, a display panel and a controller. The set document sensor detects a document sheet set on a document tray. A staple detector detects a staple attached to the document sheet bundle. On recognizing set document sheets, based on the output from the staple detector, a controller checks whether or not the set document sheets are stapled. On detecting that they are stapled, the controller makes a display panel indicate that the document sheets are stapled and cannot be conveyed.

9 Claims, 6 Drawing Sheets

IMAGE READING APPARATUS WHICH DETECTS A STAPLE ATTACHED TO A DOCUMENT AND METHOD OF CONTROLLING THE IMAGE READING APPARATUS

INCORPORATION BY REFERENCE

This application is based on and claims the benefit of Japanese Patent Application No. 2019-118691 filed on Jun. 26, 2019, the contents of which are hereby incorporated by reference.

BACKGROUND

The present disclosure relates to an image reading apparatus that conveys a set document and that reads the conveyed document.

An image reading apparatus is often fitted with a document conveying unit. The document conveying unit feeds out one document sheet after another out of a document sheet bundle that is set. The document sheets thus fed out are read. Through the reading of document sheet, image data is generated. Sometimes, a document sheet bundle that is bound with a staple is set. Bound with a staple, document sheets cannot be fed out. If document sheets are fed out, they are torn or stuck. Bound with a staple, document sheets cannot be conveyed and read.

A technique of conveying a document sheet bundle bound with a staple is known: in a conventionally disclosed automatic document feeding apparatus, document sheets on a document placement tray are separated into single sheets, which are then fed out by a document reading portion; here, prior to the feeding out, the bound part of the document sheets on the document placement tray is cut off. Thus, even when the document sheets are bound, they can be fed out automatically without being torn or causing a sheet jam.

A bound document sheet bundle can improperly be set on a document tray. When a bound document sheet bundle is set, the conveying of the document sheets should not be started. It is necessary to remove the staple on the document sheet bundle and then set the document sheet bundle once again. When a user prefers not to remove the staple, he has to place one document sheet after another on the document stage (contact glass) to read them. Which way to choose (which way to handle the bound document sheet bundle) is up to the user.

It should be noted that the conventional automatic document feeding apparatus mentioned above cuts off the bound part of document sheets without asking the user whether to do so. Even when an important document such as a contract or a confidential document is set, the apparatus cuts off the bound part without asking the user. Cutting no matter what document is undesirable.

SUMMARY

According to one aspect of the present disclosure, an image reading apparatus includes a document tray, a set document sensor, a sheet feed rotary member, an image reader, a staple detector, a display panel, and a controller. On the document tray, a plurality of document sheets can be set. The set document sensor detects one or more document sheets set on the document tray. The sheet feed rotary member is in contact with the document sheet set on the document tray. The sheet feed rotary member feeds out the document sheet toward the reading position one by one. The image reader reads the conveyed document sheet. The staple detector detects a staple attached to the document sheet bundle set on the document tray. The display panel performs display. The controller recognizes the document sheet set on the document tray based on the output from the set document sensor. On recognizing the document sheet set on the document tray, the controller checks whether or not the set document sheets are stapled based on the output from the staple detector. On judging that the document sheets are stapled, the controller makes the display panel indicate that the document sheets are bound with a staple and that the document sheets cannot be conveyed.

According to another aspect of the present disclosure, a method of controlling an image reading apparatus includes: setting a plurality of document sheets on a document tray; detecting one or more document sheets set on the document tray; by using a sheet feed rotary member that is in contact with the document sheet set on the document tray, feeding out the document sheet toward a reading position one by one; reading the conveyed document sheet; detecting a staple attached to a document sheet bundle set on the document tray; when document the document sheet are set on the document tray, checking whether or not the set document sheets are stapled; and, on judging that the document sheets are stapled, indicating that the document sheets are bound with the staple and that the document sheets cannot be conveyed.

This and other objects of the present disclosure, and the specific benefits obtained according to the present disclosure, will become apparent from the description of embodiments which follows.

DETAILED DESCRIPTION

The present disclosure is directed to preventing erroneous conveying of staple-bound document sheets. The present disclosure is directed to properly reading staple-bound document sheets without damaging them. Hereinafter, with reference to FIGS. 1 to 7, one example of an image reading apparatus according to an embodiment will be described. As an image reading apparatus, a multifunction peripheral 100 will be taken as an example. It should however be understood that the specific features mentioned in the description of embodiments in terms of structures, arrangements, and the like are not meant to limit the scope of the disclosure.

(Multifunction Peripheral 100)

Figure 1:
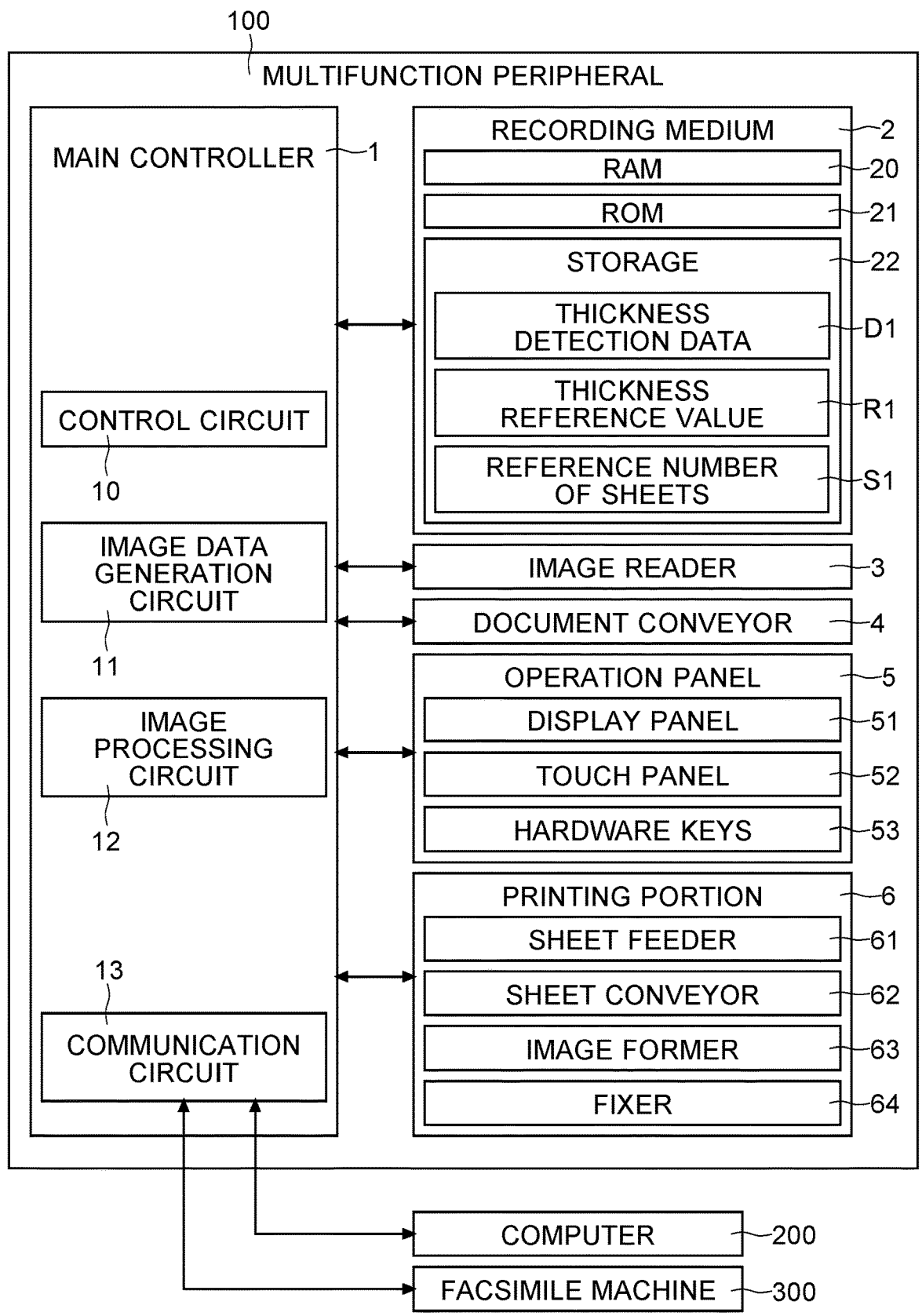
FIG. 1 is a diagram showing one example of a multifunction peripheral according to one embodiment.

With reference to FIG. 1, one example of the multifunction peripheral 100 will be described. As shown in FIG. 1, the multifunction peripheral 100 includes a main controller 1, a recording medium 2, an image reader 3, a document conveyor 4, an operation panel 5, and a printing portion 6.

The main controller 1 controls the operation of the multifunction peripheral 100. The main controller 1 control operation in a job such as a copy job or a transmission job. The main controller 1 is a circuit board that includes a control circuit 10, an image data generation circuit 11, an image processing circuit 12, and a communication circuit 13. The control circuit 10 is, for example, a CPU. The control circuit 10 performs processing and calculation related to jobs.

The image data generation circuit 11 generates read image data based on an analog image signal that the image reader 3 outputs by reading a document. For example, the image data generation circuit 11 includes, as circuits for processing an analog image signal, an amplifier circuit, an offset circuit, and an A/D conversion circuit. The A/D conversion circuit converts the analog image signal adjusted by the amplifier circuit and the offset circuit into digital data (image data). For example, the image data generation circuit 11 generates gray (monochrome) read image data (which may instead be color data). The image data generation circuit 11 generates image data of eight to ten bits per pixel. The image processing circuit 12 performs image processing. The image processing circuit 12 processes the read image data, and generates image data for printing or transmission. The image processing circuit 12 is, for example, an ASIC (an integrated circuit designed and developed for image processing).

The communication circuit 13 includes a communication control circuit, a communication memory, and a connector. The communication circuit 13 communicates with a computer 200 and a facsimile machine 300. For example, the computer 200 is a PC or a server. The operation panel 5 receives the setting of a destination. The main controller 1 makes the communication circuit 13 transmit, to the set destination, image data based on the reading of a document (scanning transmission, facsimile transmission). The communication circuit 13 also receives data for printing from the computer 200 and the facsimile machine 300. The main controller 1 makes the printing portion 6 perform printing based on the received printing data (print jobs, facsimile reception printing).

The multifunction peripheral 100 includes, as the recording medium 2, a RAM 20, a ROM 21, and a storage 22. For example, the storage 22 is an HDD or an SSD. The main controller 1 controls different parts based on the programs and data stored in the recording medium 2.

The operation panel 5 accepts setting by a user. The operation panel 5 includes a display panel 51, a touch panel 52, and hardware keys 53. The main controller 1 makes the display panel 51 display messages and setting screens. The main controller 1 makes the display panel 51 display operation images. The operation images are, for example, buttons, keys, and tabs. Based on the output from the touch panel 52, the main controller 1 recognizes operated operation images. The hardware keys 53 include a Start key and numerical keys. The touch panel 52 and the hardware keys 53 accept setting operation (operation related to jobs) by the user. For example, the operation panel 5 accepts setting of a mode for document reading. Based on the output from the operation panel 5, the main controller 1 recognizes the set contents.

The printing portion 6 includes a sheet feeder 61, a sheet conveyor 62, an image former 63, and a fixer 64. The sheet feeder 61 includes a sheet feed cassette and a pickup roller. The sheet feed cassette stores sheets. The pickup roller feeds out sheets. In a print job, the main controller 1 makes the sheet feeder 61 feed sheets. The sheet conveyor 62 includes, for sheet conveyance, a pair of sheet conveying rollers and a sheet conveying motor. The pair of sheet conveying rollers conveys sheets. The sheet conveying motor makes the pair of sheet conveying rollers rotate. The main controller 1 makes the sheet conveyor 62 convey sheets.

The image former 63 includes, for example, a photosensitive drum, a charging device, an exposure device, a developing device, and a transfer roller. The main controller 1 makes the image former 63 form a toner image based on image data. The main controller 1 makes the image former 63 transfer the toner image to a conveyed sheet. The fixer 64 includes a heater, a fixing rotary member, and a fixing motor. The heater heats the fixing rotary member. A sheet is conveyed while in contact with the fixing rotary member. Thus, the toner image is fixed to the sheet. The main controller 1 makes the fixer 64 fix the transferred toner image to the sheet. The sheet conveyor 62 discharges the printed sheet out of the apparatus.

(Document Conveyor 4, Image Reader 3)

Next, with reference to FIGS. 2 and 4, the document conveyor 4 and the image reader 3 according to the embodiment will be described. The image reader 3 includes a feed-reading contact glass 31 (reading position) and a document stage 32 (table-reading contact glass). These contact glasses are both arranged on the top face of the image reader 3. When a document is set on the document conveyor 4 (a document tray 41), the main controller 1 makes the image reader 3 perform feed-reading. Feed-reading is the reading of a document being conveyed by the document conveyor 4. When feed-reading is performed. the user sets one or more document sheets on the document tray 41 (document conveyor 4).

When no document is set on the document conveyor 4 (document tray 41), the main controller 1 makes the image reader 3 perform table-reading. Table-reading is the reading of a document set on the document stage 32. When table-reading is performed, the user sets a document on one face (the upper face) of the image reader document stage 32.

Figure 3:
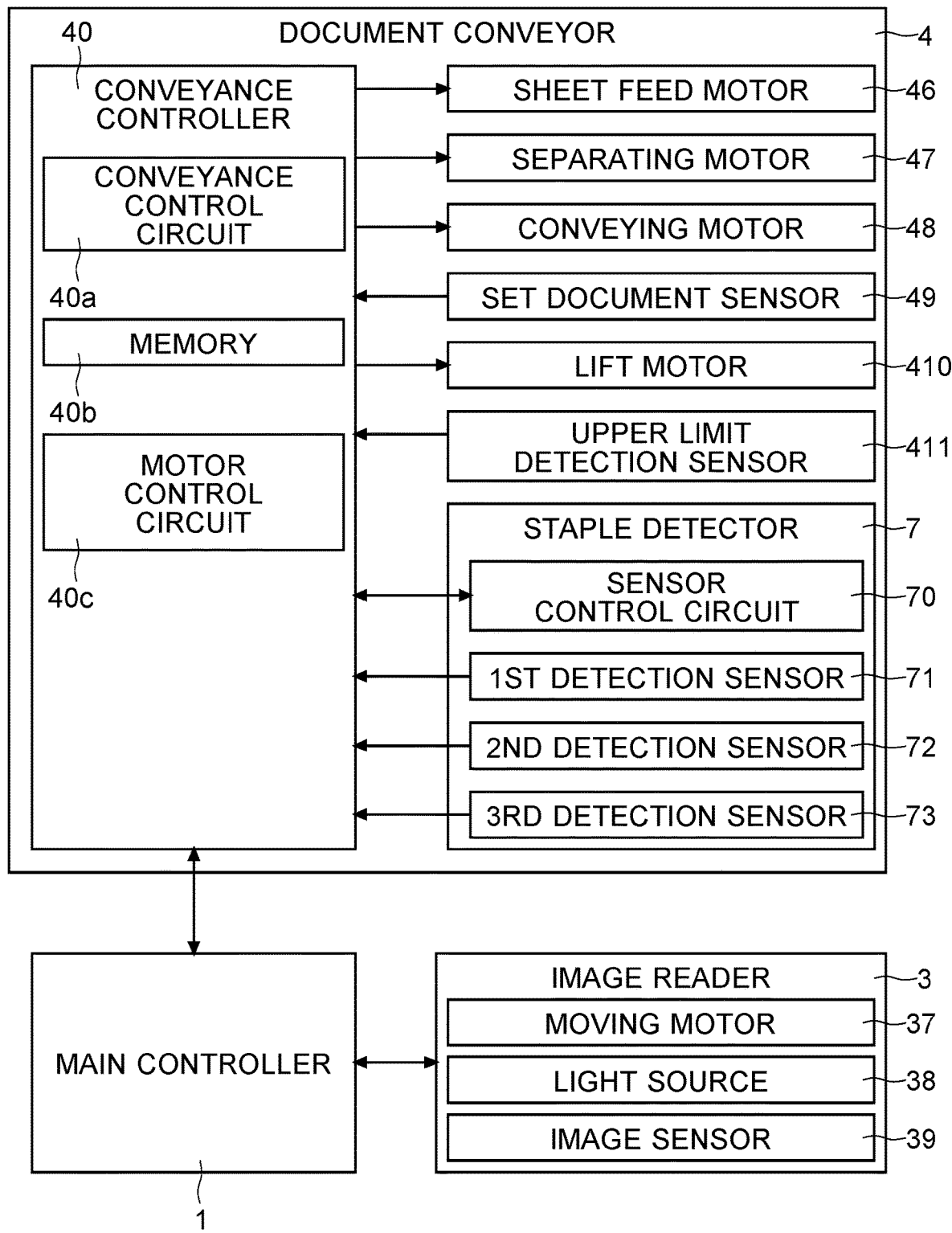
FIG. 3 is a diagram showing the document conveyor according to the embodiment.

The image reader 3 includes a carriage 33, a belt 34, a first pulley 35, a second pulley 36, and a moving motor 37 (see FIG. 3). The carriage 33 is a scanning unit of a CIS type. The image reader 3 can instead include a reading unit of a CCD type instead of a CIS type.

The belt 34 is endless. The belt 34 is wound around the pulleys. The belt 34 and the carriage 33 are connected together. The moving motor 37 transmits a driving force to the first pulley 35 or the second pulley 36. The moving motor 37 can rotate in the forward and reverse directions. When moving the carriage 33, the main controller 1 makes the moving motor 37 rotate. This causes the belt 34 to turn around. As the belt 34 turns around, the carriage 33 moves in the horizontal direction (the sub scanning direction, which is the direction perpendicular to the main scanning direction; the left-right direction in FIG. 2). The carriage 33 moves at the other side (bottom side) of the table-reading contact glass.

The carriage 33 includes a light source 38, a lens, and an image sensor 39 (see FIG. 3). When reading a document, the main controller 1 turns on a light source 38. The light source 38 shines light on the contact glasses and the document. The light source 38 is, for example, an LED. The lens directs the light reflected from the document to light-receiving elements in the image sensor 39. The image sensor 39 reads a document placed on the table-reading contact glass or a document being conveyed. The image sensor 39 is a line sensor. The image sensor 39 includes a plurality of light-receiving elements (photoelectric conversion elements, pixels). The direction in which the light-receiving elements are arranged is the main scanning direction.

The light-receiving elements receive the light reflected from the document. The light-receiving elements output an analog image signal that reflects the amount of light received (the amount of reflected light). The analog image signal is fed to the main controller 1. Based on the analog image signal fed in, the image data generation circuit 11 in the main controller 1 generates read image data.

For feed-reading, the main controller 1 moves the carriage 33 to under the feed-reading contact glass 31. The carriage 33 reads a document that passes over the feed-reading contact glass 31. For table-reading, the main controller 1 moves, under the document stage 32, the carriage 33 in the sub scanning direction at a predetermined speed. During the movement, the carriage 33 reads the document set on the image reader 32.

The document conveyor 4 is provided over the image reader 3. The document conveyor 4 conveys the set document toward the reading position (the feed-reading contact glass 31 in the image reader 3). The document conveyor 4 conveys document sheets one by one. The document conveyor 4 is fitted to the image reader 3. The document conveyor 4 opens and closes in the up-down direction by hinging at the far side of the plane of FIG. 2. The document conveyor 4 functions also as a cover that presses the contact glasses down from above.

Figure 2:
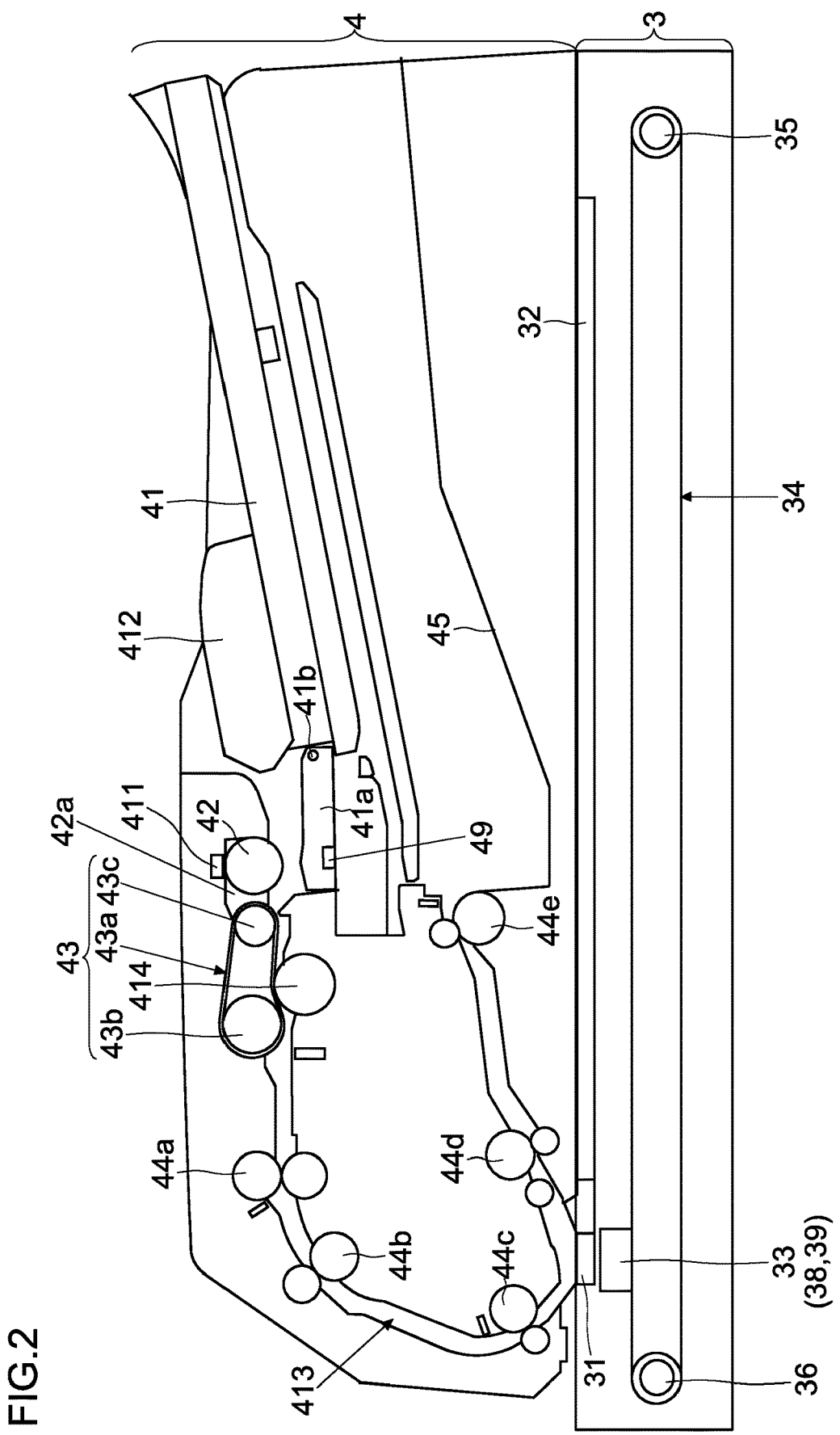
FIG. 2 is a diagram showing a document conveyor according to the embodiment.

As shown in FIG. 2, the document conveyor 4 includes, from upstream down, a document tray 41, a sheet feed roller 42 (corresponding to a sheet feed rotary member), a separating-conveying portion 43, a plurality of pairs of conveying rollers 44*a*, 44*b*, 44*c*, and 44*d*, a pair of discharge rollers 44*e*, and a document discharge tray 45. On the document tray 41, a document is set. The sheet feed roller 42 (corresponding to a sheet feed rotary member), the separating-conveying portion 43, the plurality of pairs of conveying rollers 44*a*, 44*b*, 44*c*, and 44*d*, and the pair of discharge rollers 44*e* are rotary members that convey a document. The document fed out is discharged on the document discharge tray 45.

As shown in FIG. 3, the document conveyor 4 includes a conveyance controller 40 (corresponding to a controller), a sheet feed motor 46, a separating motor 47, a conveying motor 48, a set document sensor 49, a lift motor 410, and an upper limit detection sensor 411. The conveyance controller 40 is connected to the main controller 1. The conveyance controller 40 includes a conveyance control circuit 40*a* (CPU), a memory 40*b* (a RAM and a ROM), and a motor control circuit 40*c*. The motor control circuit 40*c* (motor driver IC) controls the rotation, the stopping, and the rotation speed of motors provided in the document conveyor 4. The conveyance controller 40 is a circuit board that includes a CPU, a RAM, a ROM, an IC, and input and output terminals. The main controller 1 gives instructions to the conveyance controller 40, and thereby controls the operation of the document conveyor 4. In response to instructions from the main controller 1, the conveyance controller 40 actually controls the operation of the document conveyor 4. The sheet feed motor 46, the separating motor 47, and the conveying motor 48 are motors for rotating the rotary members for conveying a document.

Based on the output from the set document sensor 49, the conveyance controller 40 recognizes whether or not a document is set on the document tray 41. For example, the set document sensor 49 is a transmissive optical sensor. In this case, the set document sensor 49 includes a light-emitting portion (for example, an LED), a light-receiving portion (for example, a phototransistor), and an actuator. The light-emitting portion shines light toward the light-receiving face of the light-receiving portion. The output from the light-receiving portion varies with the intensity of the light received. The actuator rotates, and is biased. When no document is set, part of the actuator protrudes above the top face of the document tray 41. The actuator does not shield the light from the light-emitting portion to the light-receiving portion. When a document is set, the actuator is pushed by the document and moves to below the top face of the document tray 41. When pushed down, the actuator shields the light from the light-emitting portion to the light-receiving portion. According to whether or not a document is set, the output level of the set document sensor 49 changes.

The output from the set document sensor 49 is fed to the conveyance controller 40. Based on the output level of the set document sensor 49, the conveyance controller 40 can recognize whether or not a document is set on the document tray 41. Each time the output level of the set document sensor 49 changes, the conveyance controller 40 notifies the main controller 1 whether or not a document is set on the document tray 41. The main controller 1 thus recognizes whether or not a document is set on the document tray 41.

A downstream part of the document tray 41 is a lift portion 41*a*. The lift portion 41*a* is part of the document tray 41. The lift motor 410 is a motor for making the lift portion 41*a* ascend and descend. On recognizing that a document is set, the conveyance controller 40 makes the lift motor 410 rotate so as to raise the lift portion 41*a*. An upstream end part of the lift portion 41*a* is provided with a rotary shaft 41*b*. The lift motor 410 rotates this rotary shaft 41*b*.

The sheet feed roller 42 is provided over the lift portion 41*a*. The sheet feed roller 42 is swingable in the up-down direction. The sheet feed roller 42 is swingably supported on a support member 42*a*. The support member 42*a* is leant on the rotary shaft of a driven roller 43*c* (described in detail later).

The upper limit detection sensor 411 is a sensor for detecting the lift portion 41*a* having ascended up to the upper limit position. The upper limit detection sensor 411 is, for example, a transmissive optical sensor. When the lift portion 41*a* ascends, the document makes contact with the sheet feed roller 42. As the lift portion 41*a* continues to ascend, along with the document, the sheet feed roller 42 is raised. When the sheet feed roller 42 is raised up to the upper limit, a projection provided on the sheet feed roller 42 shields the upper limit detection sensor 411. According to whether nor not the sheet feed roller 42 is at the upper limit position, the output level changes. The output from the upper limit detection sensor 411 is fed to the conveyance controller 40. Based on the output from the upper limit detection sensor 411, the conveyance controller 40 recognizes whether or not the sheet feed roller 42 is at the upper limit position. On recognizing that the sheet feed roller 42 has reached the upper limit position, the conveyance controller 40 stops the lift motor 410.

The document conveyor 4 further includes a staple detector 7. The staple detector 7 detects a staple attached to the document (document sheet bundle) set on the document tray 41. The output from the staple detector 7 is fed to the conveyance controller 40. Based on the output from the staple detector 7, the conveyance controller 40 judges whether or not the set document (document sheet bundle) is stapled The staple detector 7 includes a sensor control circuit 70 and a plurality of detection sensors. The detection sensors are provided over the set document. The detection sensors are, for example, sensors that detect metals. In this case, the detection sensors include coils. The sensor control circuit 70 passes an electric current of a predetermined frequency in the coils of the detection sensors. A magnetic field appears around the coils.

Staples are made of metal. When there is a staple in the detection range of a detection sensor, in the magnetic field of the coil, an electric current passes in the staple. As a result, a secondary magnetic field appears in the staple. The secondary magnetic field causes an electric current to pass in the coil. Based on whether or not this electric current is present, the sensor control circuit 70 can recognize whether or not there is a staple. The sensor control circuit 70 and the conveyance controller 40 communicate with each other. Based on the communication with the sensor control circuit 70, the conveyance controller 40 can recognize whether or not the detection sensors have detected a staple.

Figure 4:
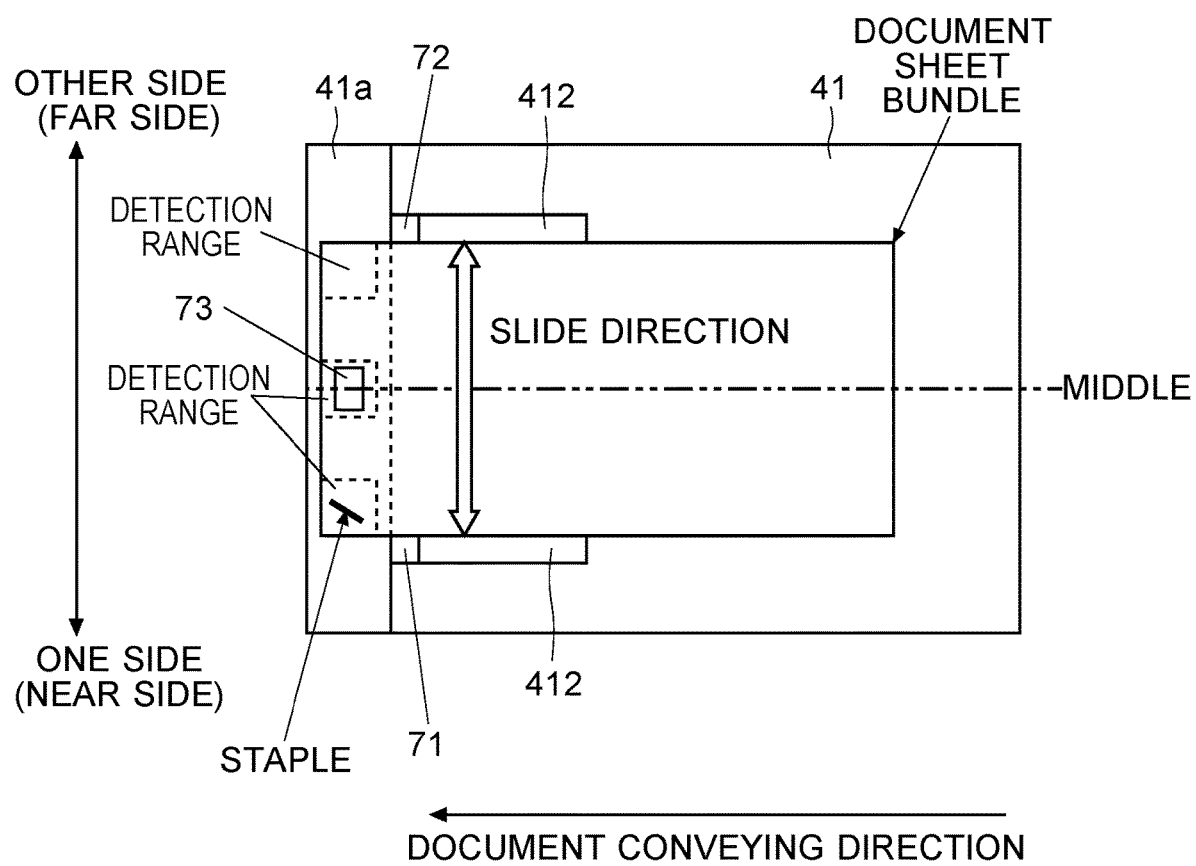
FIG. 4 is a diagram showing an example of the arrangement of a staple detecting portion according to the embodiment.

As shown in FIG. 4, the document tray 41 includes a pair of regulating cursors 412 that regulates the document. The pair of regulating cursors 412 can move in the direction perpendicular to the document conveying direction. The pair of regulating cursors 412 moves in a coordinated manner. The pair of regulating cursors 412 is so slid as to hold the document between them. This keeps the document in position. A document sheet bundle is often bound in a corner with a staple. Accordingly, the regulating cursors can each be provided with a detection sensor (a first detection sensor 71 and a second detection sensor 72).

With reference to FIG. 4, an example of the arrangement of the detection sensors will be described. FIG. 4 is a schematic diagram of the document tray 41 as seen from above. In FIG. 4, the broken-line rectangular indicates one example of the detection ranges of the detection sensors. For example, the first detection sensor 71 is provided at one side (the near side of the multifunction peripheral 100) in the direction perpendicular to the document conveying direction. The first detection sensor 71 has its detection range in a corner part at one side in the direction perpendicular the document conveying direction at the downstream side in the document conveying direction. The second detection sensor 72 is provided at the other side (the far side of the multifunction peripheral 100) in the direction perpendicular to the document conveying direction. The second detection sensor 72 has its detection range in a corner part at the other side in the direction perpendicular the document conveying direction at the downstream side in the document conveying direction.

A document is sometimes bound with a staple around the middle in the direction perpendicular to the document conveying direction. Accordingly, there can be provided a third detection sensor 73 that has its detection range in a middle part in the direction perpendicular the document conveying direction at the downstream side in the document conveying direction. For example, the third detection sensor 73 is provided inside the document tray 41. Or the third detection sensor 73 can be embedded in the top face (exterior face) of the document tray 41.

Based on the outputs from the detection sensors, the conveyance controller 40 judges whether or not the document sheet bundle is bound with a staple. When any of the detection sensors outputs the level indicating detection of metal, the conveyance controller 40 judges that the document sheet bundle is bound with a staple. When none of the detection sensors outputs the level indicating detection of metal, the conveyance controller 40 judges that the document sheet bundle is not bound with a staple.

The detection sensors can be cameras (two-dimensional image sensors). In that case, the first detection sensor 71 shoots a corner part of the document sheet bundle at one side in the direction perpendicular to the document conveying direction at the downstream side in the document conveying direction. The second detection sensor 72 shoots a corner part of the document sheet bundle at the other side in the direction perpendicular to the document conveying direction at the downstream side in the document conveying direction. The third detection sensor 73 shoots a middle part of the document sheet bundle in the direction perpendicular to the document conveying direction at the downstream side in the document conveying direction.

In a case where the detection sensors are cameras (image sensors), the conveyance controller 40 processes the analog image signals output from the detection sensors, and generates three sets of shot data (digital data). The conveyance controller 40 checks whether or not a staple is shot in those sets of shot data. For example, the conveyance controller 40 performs template matching to check whether or not a staple is shot. The conveyance controller 40 can be provided with a circuit that performs image processing for template matching.

for example, the recording medium 2 stores, in a non-volatile manner, a standard pattern image that is used in template matching. The standard pattern image is an image of a staple. For example, the conveyance controller 40 uses the SSD (sum of squared differences) formula. When any set of shot data contains an image with a degree of similarity higher than a threshold value with the standard pattern image, the conveyance controller 40 judges that the document sheet bundle is bound with a staple. When there is no shot data that contains an image with a degree of similarity higher than a threshold value with the standard pattern image, the conveyance controller 40 judges that the document sheet bundle is not bound with a staple.

When the sheet feed roller 42 and the topmost document sheet are in contact with each other and in addition the set document sheet bundle is not bound, in response to the operation panel 5 accepting an instruction to start document reading (an operation on the Start button), the main controller 1 instructs the conveyance controller 40 to convey the document. Jobs that involve the reading of a document includes a copy job and a scan transmission job.

Instructed by the main controller 1, the conveyance controller 40 makes the sheet feed motor 46, the separating motor 47, and the conveying motor 48 operate. Specifically, rotating the sheet feed motor 46 results in rotating the sheet feed roller 42. As the sheet feed roller 42 rotates, out of the document set on the document tray 41, the topmost document sheet is fed into a document conveying passage 413.

The separating-conveying portion 43 includes a sheet feed belt 43a and a separation roller 414. The sheet feed belt 43a is wound around a driving roller 43b and a driven roller 43c. The conveyance controller 40 makes the sheet feed motor 46 rotate. As a result, the driving roller 43b rotates, and the sheet feed belt 43a moves around. The sheet feed belt 43a feeds the document sheet fed from the sheet feed roller 42 downstream in the conveying direction.

The separation roller 414 is provided under the sheet feed belt 43a. The separation roller 414 is in contact with the sheet feed belt 43a. The separating motor 47 rotates the separation roller 414. As the sheet feed motor 46 rotates, the separation roller 414 rotates in a direction in which it feeds the document sheet back to the document tray 41. When multiple feeding of document sheets is occurring, the separation roller 414 separates any document sheet other than the topmost one and feeds it back toward the document tray 41.

The pairs of conveying rollers 44a, 44b, 44c, and 44d and the pair of discharge rollers 44e convey the document sheet along the document conveying passage 413. Eventually, the document is discharged onto the document discharge tray 45. The conveying motor 48 rotates the pairs of conveying rollers 44a, 44b, 44c, and 44d and the pair of discharge rollers 44e. During document conveyance, the conveyance controller 40 makes the conveying motor 48 rotate.

(Processing in Response to the Setting of a Document)

Figure 5:
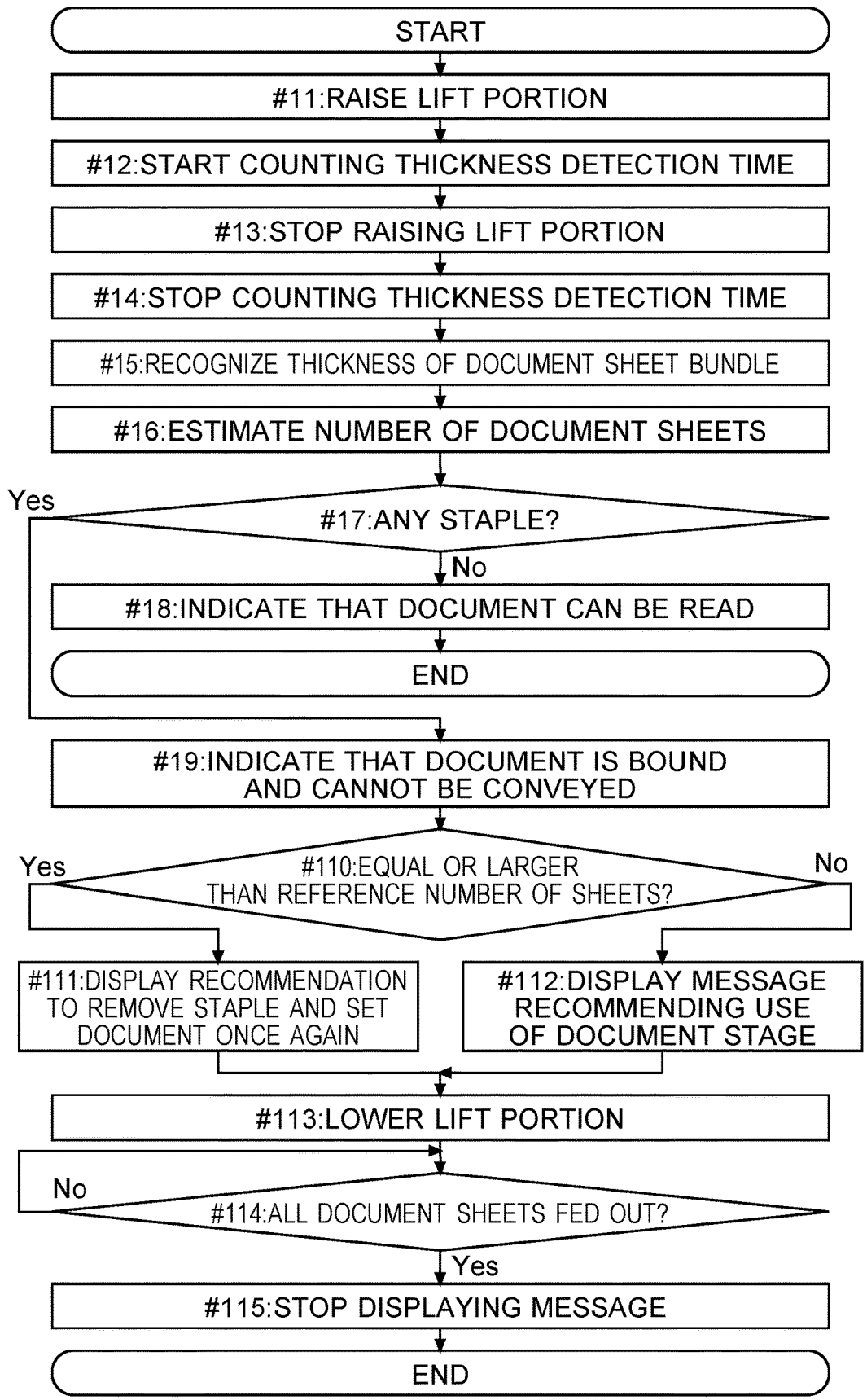
FIG. 5 is a diagram showing one example of the procedure in response to the setting of a document on the multifunction peripheral according to the embodiment.

Next, with reference to FIGS. 5 to 7, one example of the processing in response to the setting of a document on the multifunction peripheral 100 according to the embodiment will be described. When a document is set on the document tray 41 (when the set document sensor 49 detects a document being set), the conveyance controller 40 performs processing for conveying the document. With reference to FIG. 5, one example of the processing in response to the setting of a document will be described.

The procedure in FIG. 5 starts when the conveyance controller 40 recognizes a document being set based on the output from the set document sensor 49. First, the conveyance controller 40 makes the lift portion 41a ascend (step #11). Specifically, the conveyance controller 40 makes the lift motor 410 rotate in the direction in which it raises the lift portion 41a. As a result, the rotary shaft 41b of the lift portion 41a rotates. A downstream end part of the lift portion 41a ascends.

The conveyance controller 40 also starts to count the time for thickness detection (step #12). The time point of the start of the counting of the thickness detection time is the time point of the start of the rotation of the lift motor 410. As the lift portion 41a ascends, the topmost document sheet of the set document eventually makes contact with the sheet feed roller 42.

After the start of the ascent of the lift portion 41a, when the upper limit detection sensor 411 detects the sheet feed roller 42 reaching the upper limit, the conveyance controller 40 stops the ascent of the lift portion 41a (step #13). Specifically, the conveyance controller 40 stops the rotation of the lift motor 410. Moreover, the conveyance controller 40 ends the counting of the thickness detection time (step #14). The conveyance controller 40 counts the time from the start to the end of the ascent of the lift portion 41a as the thickness detection time.

Here, the thickness detection time varies with the thickness of the set document. The thicker the set document, the shorter the time until the detection of the upper limit being reached. This is because, the thicker the document, the smaller the amount of ascent of the lift portion 41a until the upper limit is reached. To put otherwise, the thinner the set document, the longer the time until the detection of the upper limit being reached. This is because, the thinner the document, the larger the amount of ascent of the lift portion 41a until the upper limit is reached.

Based on the thickness detection time, the conveyance controller 40 recognizes the thickness of the set document sheet bundle (step #15). The recording medium 2 stores thickness detection data D1 in a non-volatile manner (see FIG. 1). The thickness detection data D1 is table data in which different document thicknesses are defined for different thickness detection times. In the thickness detection data D1, the shorter the thickness detection time, the larger the value that is defined as the document thickness; the longer the thickness detection time, the smaller the value that is defined as the document thickness The conveyance controller 40 estimates the number of sheets in the set document (Step #16). Specifically, the conveyance controller 40 estimates the number of sheets of the set document by dividing the recognized thickness of the document sheet bundle by a sheet thickness reference value R1. The thickness reference value R1 is prescribed. The thickness reference value R1 represents the thickness per sheet. The recording medium 2 stores the thickness reference value R1 in a non-volatile manner. The operation panel 5 can accept the setting of the thickness reference value R1. In that case, the recording medium 2 stores the set thickness reference value R1 in a non-volatile manner. When estimating the number of sheets, the conveyance controller 40 calculates it by reading the thickness reference value R1 stored on the recording medium 2.

The conveyance controller 40 checks whether or not the document sheet bundle is stapled (whether or not it is bound with a staple) (step #17). When it is not stapled (step #17, "No"), the conveyance controller 40 makes the display panel 51 display a message indicating that the document sheet bundle on the document tray 41 can be read (step #18). Then the conveyance controller 40 ends the procedure in the flow chart ("END").

When the procedure in the flow chart ends via step #18, the operation panel 5 accepts instruction to start the reading of a document (an instruction to start a job). When an instruction to start reading is entered, the main controller 1 makes the document conveyor 4 convey the document one sheet after another. The document conveyor 4 continuously conveys the document while keeping a predetermined sheet-to-sheet interval between one document sheet and the next. The main controller 1 also makes the image reader 3 read the conveyed document.

On the other hand, when the document sheet bundle is stapled (when it is bound with a staple) (step #17, "Yes"), the conveyance controller 40 makes the display panel 51 display a message indicating that the document sheet bundle is bound with a staple and that the document cannot be conveyed (step #19). FIGS. 6 and 7 show examples of message display screens 54.

The conveyance controller 40 further checks whether or not the estimated number of sheets is equal to or larger than a reference number of sheets S1. The reference number of sheets S1 is prescribed. The reference number of sheets S1 is set to be a number of sheets from several to ten sheets. The reference number of sheets S1 is a value for determining the recommended reading method. The operation panel 5 can accept the setting of the reference number of sheets S1. In that case, the recording medium 2 stores the reference number of sheets S1 in a non-volatile manner.

Figure 6:
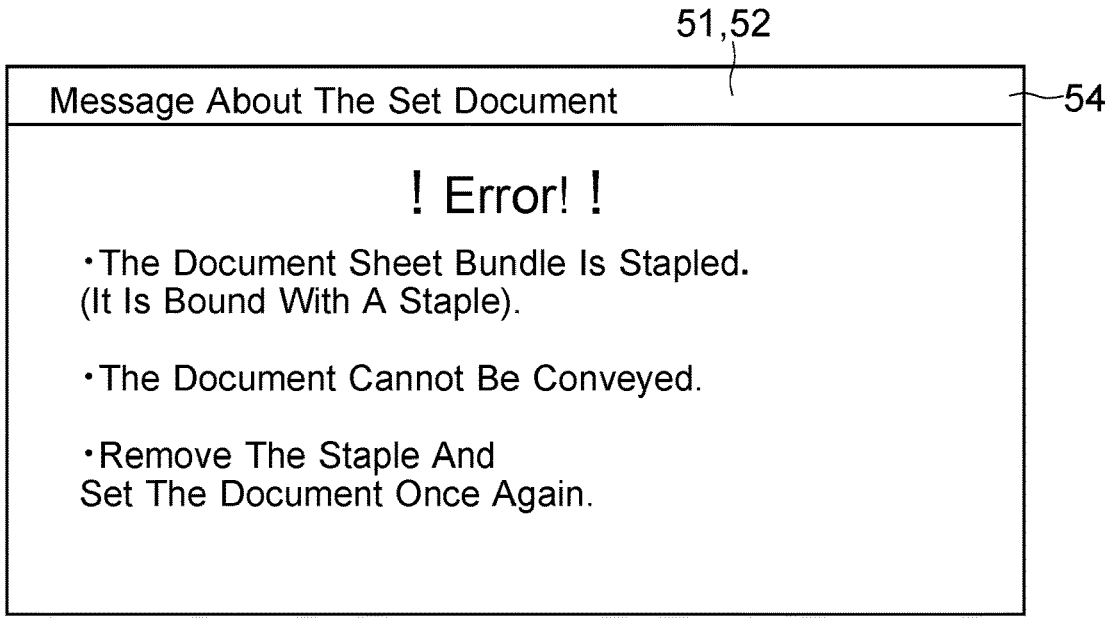
FIG. 6 is a diagram showing one example of a message display screen according to the embodiment.
Figure 7:
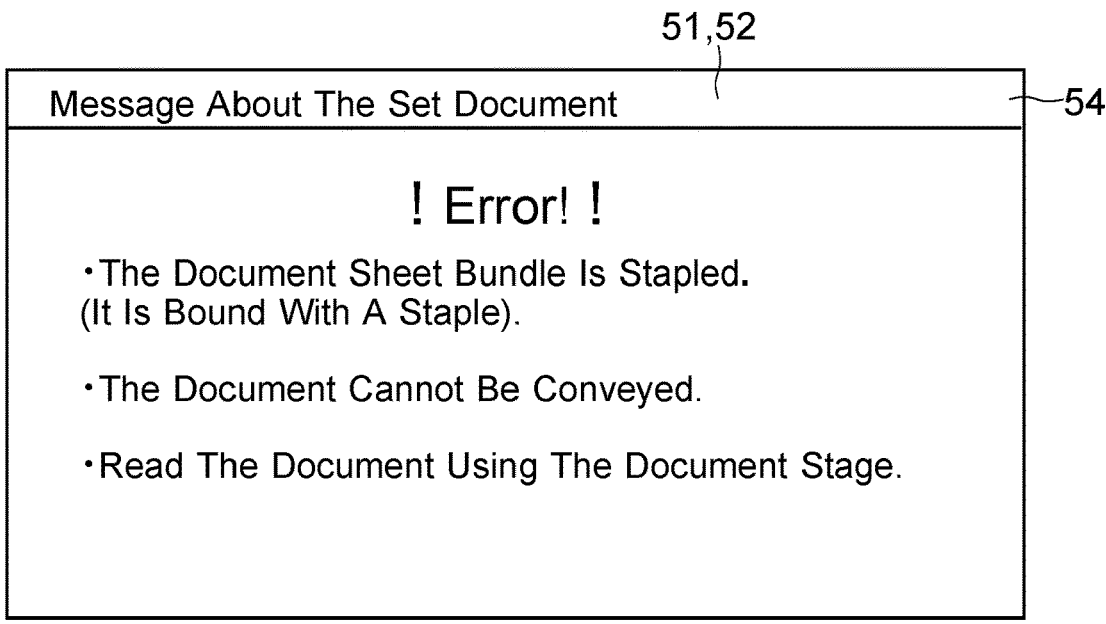
FIG. 7 is a diagram showing another example of a message display screen according to the embodiment.

When the estimated number of sheets is equal to or larger than the reference number of sheets S1 (step #110, "Yes"), the conveyance controller 40 makes the display panel 51 display a message recommending removing the staple and setting the document once again (step #111; see FIG. 6). When the estimated number of sheets is smaller than the reference number of sheets S1 (step #110, "No"), the conveyance controller 40 makes the display panel 51 display a message recommending the reading of the document using the document stage 32 (step #112; see FIG. 7).

When the document contains a large number of sheets and reading the document sheet by sheet on the document stage 32 is expected to take long, the conveyance controller 40 recommends the user removing the staple. When removing the staple and using the document conveyor 4 is expected to take less trouble, the conveyance controller 40 recommends the user removing the staple.

On the other hand, when the document contains a small number of sheets and removing the staple is expected to take more trouble than reading the document sheet by sheet on the document stage 32, the conveyance controller 40 recommends the user reading the document using the document stage 32.

When step #111 or #112 is reached, the conveyance controller 40 makes the lift portion 41a descend (step #113). The conveyance controller 40 makes the lift motor 410 rotate in the direction in which it lowers the lift portion 41a. As a result, the lift portion 41a descends down to the lower limit position (basic position). The document sheet bundle is thus easy to remove from the document tray 41. Also, rotating the sheet feed roller 42 no longer feeds the document. The conveyance controller 40 maintains a state where the document cannot be fed out. So long as a document sheet bundle bound with a staple is set, the conveyance controller 40 does not start to convey the document. The conveyance controller 40 does not make the sheet feed roller 42 and the sheet feed motor 46 rotate.

The conveyance controller 40 continues to check whether or not all the document sheets on the document tray 41 have been fed out (step #114, "No" then back to step #114). When all the document sheets on the document tray 41 have been fed out (when no document is set any longer) (Step #114, "Yes"), the conveyance controller 40 makes the display panel 51 stop the display of the message at step #19 and the message at step #111 or #112 (step #115). Then the conveyance controller 40 ends the procedure in the flow chart ("END").

As described above, an image reading apparatus (multifunction peripheral 100) according to an embodiment includes a document tray 41, a set document sensor 49, a sheet feed rotary member (sheet feed roller 42), a image reader 3, a staple detector 7, a display panel 51, and a controller (conveyance controller 40). On the document tray 41, a plurality of document sheets can be set. The set document sensor 49 detects one or more document sheets set on the document tray 41. The sheet feed rotary member is in contact with the document sheet set on the document tray 41. The sheet feed rotary member feeds out the document sheet toward the reading position one by one. The image reader 3 reads the conveyed document sheet. The staple detector 7 detects a staple attached to the document sheet bundle set on the document tray 41. The display panel 51 performs display. The controller recognizes the document sheet set on the document tray 41 based on the output from the set document sensor 49. On recognizing the document sheet set on the document tray 41, the controller checks whether or not the set document sheets are stapled based on the output from the staple detector 7. On judging that the document sheets are stapled, the controller makes the display panel 51 indicate that the document sheets are bound with a staple and that the document sheets cannot be conveyed.

It is possible to let the user know that the set document sheet bundle is bound with a staple. It is possible to let the user know that a bound document sheet bundle is improperly set on the document tray 41. It is thus possible to prompt the user to proper document reading.

The controller recognizes the thickness of the document sheet bundle set on the document tray 41. The controller estimates the number of document sheets included in the document sheet bundle based on the recognized thickness of the document sheet bundle. When the estimated number of sheets is equal to or larger than a prescribed reference number of sheets S1, the controller makes the display panel 51 indicate that the staple should be removed and the document sheets should be set once again. When the set document includes a large number of sheets, it is troublesome to repeat the reading of the document sheet by sheet. For example, when the document includes 100 sheets, it is necessary to repeat setting the document on the document stage 32 one hundred times. When the set document includes a large number of sheets, it is possible to prompt the user to remove the staple. In a case where reading a document while conveying it automatically is expected to be less troublesome, it is possible to prompt the user to remove the staple and set the document on the document tray 41 once again.

The image reading apparatus includes a document stage 32 on which document sheets are set one by one. The image reader 3 reads the document sheet set on the document stage 32. When the estimated number of sheets is smaller than the reference number of sheets S1, the controller makes the display panel 51 display a message recommending the reading of the document sheets using the document stage 32. In a case where the set document includes a small number of sheets, reading it sheet by sheet is not very troublesome. When the set document is judged to include a small number of sheets, it is possible to prompt the user to read it using the document stage 32. It is also possible to prompt the user to use the document stage 32 without removing the staple.

The controller estimates the number of set document sheets (the number of sheets in the document sheet bundle) by dividing the recognized thickness of the document sheet bundle by a prescribed sheet thickness reference value R1 which represents a thickness per document sheet.

The image reading apparatus (multifunction peripheral 100) includes a lift motor 410 and an upper limit detection sensor 411. The lift motor 410 makes part (a lift portion 41a) of the document tray ascend and descend. The upper limit detection sensor 411 detects the sheet feed rotary member (sheet feed roller 42) reaching the upper limit. The controller counts as the thickness detection time the time after the lift motor 410 starts to rotate until the sheet feed roller is detected having reached the upper limit. The controller recognizes the thickness of the set document sheet bundle based on the thickness detection time. It is possible to accurately measure the thickness of the set document sheet bundle.

The staple detector 7 detects the staple attached to the document sheets by metal detection. It is possible to accurately recognize the attachment of the staple to the set document.

The staple detector 7 includes: a first detection sensor that has a detection range in a corner part of the document sheets at one side in the direction perpendicular to the document conveying direction at the downstream side in the document conveying direction; a second detection sensor that has a detection range in a corner part of the document sheets at the other side in the direction perpendicular to the document conveying direction at the downstream side in the document conveying direction; and a third detection sensor that has a detection range in a middle part of the document sheets in the direction perpendicular to the document conveying direction at the downstream side in the document conveying direction.

While embodiments of the present disclosure have been described above, they are in no way meant to limit the scope of the present disclosure; they can be implemented with any modifications made without departing from the spirit of the present disclosure.

The present disclosure is applicable to image reading apparatuses that feed out set document sheets one by one.

What is claimed is:

1. An image reading apparatus comprising:
   a document tray on which a plurality of document sheets can be set;
   a set document sensor that detects one or more document sheets set on the document tray;
   a sheet feed rotary member that is in contact with the document sheet set on the document tray and that feeds out the document sheet toward a reading position one by one;
   an image reader that reads the conveyed document sheet;
   a staple detector that detects a staple attached to a document sheet bundle set on the document tray;
   a display panel that performs display; and
   a controller that recognizes the document sheet set on the document tray based on an output from the set document sensor,
   the controller, on recognizing the document sheet set on the document tray, checking whether or not the set document sheets are stapled based on an output from the staple detector,
   the controller, on judging that the document sheets are stapled, making the display panel indicate that the document sheets are bound with the staple and that the document sheets cannot be conveyed,
   the controller recognizing a thickness of the document sheet bundle set on the document tray,
   the controller estimating a number of document sheets included in the document sheet bundle based on the recognized thickness of the document sheet bundle,
   when the estimated number of sheets is equal to or larger than a prescribed reference number of sheets, the controller making the display panel indicate that the staple should be removed and the document sheets should be set once again.

2. The image reading apparatus according to claim 1, further comprising:
   a document stage on which the document sheets are set one by one,
   wherein
   the image reader reads the document sheet set on the document stage, and
   when the estimated number of sheets is smaller than the reference number of sheets, the controller makes the display panel display a message recommending reading of the document sheets using the document stage.

3. The image reading apparatus according to claim 1, wherein
   the controller estimates the number of set document sheets by dividing the recognized thickness of the document sheet bundle by a prescribed sheet thickness reference value which represents a thickness per document sheet.

4. The image reading apparatus according to claim 1, further comprising:
   a lift motor that makes part of the document tray ascend and descend; and
   an upper limit detection sensor that detects the sheet feed rotary member reaching an upper limit,
   wherein
   the controller counts as a thickness detection time a time after the lift motor starts to rotate until the sheet feed rotary member is detected having reached the upper limit, and
   the controller recognizes the thickness of the set document sheet bundle based on the thickness detection time.

5. The image reading apparatus according to claim 2, wherein
   the controller estimates the number of set document sheets by dividing the recognized thickness of the document sheet bundle by a prescribed sheet thickness reference value which represents a thickness per document sheet.

6. The image reading apparatus according to claim 2, wherein
   a lift motor that makes part of the document tray ascend and descend; and
   an upper limit detection sensor that detects the sheet feed rotary member reaching an upper limit,
   wherein
   the controller counts as a thickness detection time a time after the lift motor starts to rotate until the sheet feed rotary member is detected having reached the upper limit, and
   the controller recognizes the thickness of the set document sheet bundle based on the thickness detection time.

7. The image reading apparatus according to claim 1, wherein
   the staple detector detects the staple attached to the document sheets by metal detection.

8. The image reading apparatus according to claim 7, wherein
   the staple detector includes:
   a first detection sensor that has a detection range in a corner part of the document sheets at one side in a direction perpendicular to a document conveying direction at a downstream side in the document conveying direction;
   a second detection sensor that has a detection range in a corner part of the document sheets at the other side in the direction perpendicular to the document conveying direction at the downstream side in the document conveying direction; and
   a third detection sensor that has a detection range in a middle part of the document sheets in the direction perpendicular to the document conveying direction at the downstream side in the document conveying direction.

9. A method of controlling an image reading apparatus, the method comprising:
   setting a plurality of document sheets on a document tray;
   detecting one or more document sheets set on the document tray;
   by using a sheet feed rotary member that is in contact with the document sheet set on the document tray, feeding out the document sheet toward a reading position one by one;
   reading the conveyed document sheet;
   detecting a staple attached to a document sheet bundle set on the document tray;
   when document sheets are set on the document tray, checking whether or not the set document sheets are stapled;
   on judging that the document sheets are stapled, indicating that the document sheets are bound with the staple and that the document sheets cannot be conveyed;
   recognizing a thickness of the document sheet bundle set on the document tray;
   estimating a number of document sheets included in the document sheet bundle based on the recognized thickness of the document sheet bundle; and when the estimated number of sheets is equal to or larger than a prescribed reference number of sheets, indicating that the staple should be removed and the document sheets should be set once again.

* * * * *